United States Patent
Brockhaus

(10) Patent No.: US 6,834,555 B2
(45) Date of Patent: Dec. 28, 2004

(54) MAGNETOINDUCTIVE FLOW MEASURING METHOD

(75) Inventor: Helmut Brockhaus, Dinslaken (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 71 days.

(21) Appl. No.: 10/368,966

(22) Filed: Feb. 19, 2003

(65) Prior Publication Data

US 2003/0213310 A1 Nov. 20, 2003

(30) Foreign Application Priority Data

Mar. 28, 2002 (DE) ......................................... 102 14 323

(51) Int. Cl.$^7$ ................................................ G01F 1/58
(52) U.S. Cl. .................................................... 73/861.12
(58) Field of Search ............ 73/861.08, 861.11–861.17; 361/152–154; 324/204–205

(56) References Cited

U.S. PATENT DOCUMENTS

| | | | |
|---|---|---|---|
| 4,422,337 A | * 12/1983 | Hafner | ..................... 73/861.17 |
| 4,672,331 A | * 6/1987 | Cushing | ..................... 331/65 |
| 6,644,127 B1 | * 11/2003 | Matzen | ..................... 73/861.12 |

FOREIGN PATENT DOCUMENTS

| | | |
|---|---|---|
| DE | 34 23 076 C2 | 1/1986 |
| DE | 199 38 160 A1 | 4/2001 |
| EP | 0 521 448 A2 | 6/1992 |
| JP | 2000-028408 A | 1/2000 |

* cited by examiner

Primary Examiner—Edward Lefkowitz
Assistant Examiner—Corey D. Mack
(74) Attorney, Agent, or Firm—Cesari and McKenna, LLP

(57) ABSTRACT

A magnetoinductive flow measuring method for measuring the flow rate of a medium flowing through a measuring tube is described that incorporates two measuring electrodes positioned along a connecting line extending in an essentially perpendicular direction relative to the measuring-tube axis, whereby a magnetic field is generated that extends at least in an essentially perpendicular direction relative to the measuring-tube axis and to the connecting line of the measuring electrodes and whereby the flow rate of the medium moving through the measuring tube is determined by measuring the voltage, respectively collected at one or both measuring electrodes, in comparison with a reference voltage potential. According to the method, the flow measuring operation is initiated as soon as an increase in the flow rate is detected, thus permitting the precise measurement even of very rapid draw-off processes.

10 Claims, 1 Drawing Sheet

MAGNETOINDUCTIVE FLOW MEASURING METHOD

BACKGROUND OF THE INVENTION

1. Field of the Invention

This invention relates to a magnetoinductive flow measuring method for measuring the flow of a medium moving through a measuring tube that is equipped with two measuring electrodes positioned along a connecting line extending in an essentially perpendicular direction relative to the axis of the measuring tube, whereby a magnetic field is generated that extends at least in an essentially perpendicular direction relative to the axis of the measuring tube and to the connecting line of the measuring electrodes and whereby the flow rate of the moving medium through the measuring tube is determined by measuring the voltage, respectively collected at one or both measuring electrodes, in comparison with a reference voltage potential.

2. Description of the Prior Art

Magnetoinductive flow measuring processes of the type mentioned above have been in the public domain for some time and have been widely employed for a variety of applications. The fundamental principle of a magnetoinductive flowmeter for moving media goes all the way back to Faraday who as early as 1832 proposed the use of the electrodynamic induction principle for measuring flow rates. Faraday's law of induction stipulates that in a medium flowing through a magnetic field and containing charge carriers, an electric field intensity is generated perpendicular to the flow direction and to the magnetic field. A magnetoinductive flowmeter utilizes Faraday's law of induction by means of a magnet that typically consists of two magnetic poles, each with a field coil, and generates a magnetic field perpendicular to the direction of the flow in the measuring tube. Within that magnetic field each volume element of the flowing medium, traveling through the magnetic field and containing a certain number of charge carriers, contributes the field intensity generated in the volume element concerned to the measuring voltage that can be collected via measuring electrodes. In conventional magnetoinductive flowmeters, the measuring electrodes are designed either for conductive or for capacitive coupling with the flowing medium. One salient feature of magnetoinductive flowmeters is the proportionality between the measured voltage and the flow rate of the medium as averaged across the diameter of the measuring tube, i.e. between the measuring voltage and the flow volume.

In applied flowmetering operations, the magnetoinductive flow measuring process usually involves periodic directional alternation of the magnetic field. The prior art shows a variety of approaches to that effect. For example, magnetoinductive flow measurement can be accomplished using an alternating field in which case the field coils of the magnet typically receive a sinusoidal 50 Hz voltage directly from an AC line source. However, the measuring voltage generated by the flow between the measuring electrodes tends to be heterodyned by transformation noise as well as line voltage interference.

Current magnetoinductive flow measuring practice, therefore, generally employs a switched direct-current field. A switched continuous field of that nature is obtained by feeding a periodically polarity-alternating square-wave current to the field coils of the magnet. Also possible, however, is a magnetoinductive flow measurement process using a pulsating continuous field obtained by only periodically supplying the field coils of the magnet with a time-controlled square-wave current of unchanging polarity. Yet a method that periodically reverses the field current is preferred because alternating the polarity of the magnetic field permits the suppression of interference potentials such as galvanic noise.

Using a pole-reversible, switched constant-current field makes it necessary after each reversal to wait for the magnetic field to stabilize. That is followed by the up-slope integration of the measured voltage, for instance the voltage differential between the electrodes, until the field current polarity is again reversed. Waiting for the magnetic field to stabilize is important for achieving good measuring accuracy. As indicated in EP 0 809 089 A2, the measuring signal itself can be used during the transient phase of the magnetic field. That is not easily accomplished and, besides, the measuring signal is weaker during the transient phase than in the stabilized state given that the measuring signal is inherently proportional to the magnetic field.

Particular problems are encountered in magnetoinductive flow measuring especially when relatively high-speed decanting or racking processes are to be metered. Such a process essentially consists of three stages, i.e. the initial draw-off characterized by an accelerating flow pattern, followed by a constant flow rate, and finally the draw-off end stage characterized by a decelerating flow rate typically slowing to zero. In practice, the first i.e. starting stage in high-speed draw-off processes takes from 20 to 100 ms, followed by a constant flow for a time span of typically between 0.5 and 10 s.

The problem in the case of rapid draw-off processes is that the transient stabilizing phase of the magnetic field negatively affects the measuring accuracy, since during the stabilizing time intervals no measurements, or at least no accurate measurements, can be made. This is of critical significance especially at the beginning of the draw-off process where the flow rate changes quite rapidly. If the medium is drawn off during that very stabilization phase of the magnetic field, any volumetric determination will be impossible or inaccurate at best. In contrast to that, an error introduced by the transient phase of the magnetic field poses no problem in the case of a constant flow rate since interpolations can be readily applied.

SUMMARY OF THE INVENTION

It is therefore the objective of this invention to present a magnetoinductive flow measuring method that permits highly precise measurements even in high-speed draw-off processes.

The magnetoinductive flow measuring method that achieves the objective derived and specified above is characterized in that the flow metering operation is initiated the moment an accelerated flow rate is detected.

This means that the flow metering process, typically involving a switching of the magnetic field with the concomitant magnetic-field stabilization problem explained above, does not begin until the detection of an increasing flow rate signals the start of a draw-off cycle. In this context the flow may be measured by practically any prior-art flow metering technique. However, a preferred mode of implementation of this invention provides for the periodic alternating of the magnetic field during the flow measuring process with particular preference given to the use of a switched, pole-reversible constant-current field.

The flow measuring operation is not initiated for as long as a constant flow is detected. In this connection, a preferred embodiment of the invention provides for the magnetic field to be kept constant for as long as a constant flow is detected. "Kept constant" in this case means that, in any event, the polarity of the magnetic field is not periodically alternated as it would be during the flow measuring operation. In particular, "kept constant" signifies that, compared to a measuring operation, the magnetic field is held in a constant state for distinctly longer periods. The magnetic field is to be kept constant along that line for as long as the flow rate detected remains constant. Of course, a constant flow rate that would keep the magnetic field constant is usually a flow rate of constantly zero.

It should be pointed out that, while during the constant state of the magnetic field, a medium flow through the measuring tube is inherently detectable by tapping the voltage differential between the measuring electrodes, that does not constitute a flow measuring operation as defined by the invention. Yet with the magnetic field in a constant state, it is possible to derive an indication, indeed a quantitative indication, of the augmentation of the magnetic field engendered by an accelerated flow rate.

The magnetoinductive flow measuring method is preferably further enhanced by the capability of terminating the flow measuring process as soon as the flow value detected drops below a predefined minimum level. Accordingly, in the case of a periodically reversed magnetic field, that magnetic field assumes a constant state as soon as the flow value measured drops below a predefined minimum value.

To gauge the flow rate for controlling the magnetic field in the above-described fashion, it is entirely possible to use an additional flowmeter. A preferred embodiment of the invention, however, provides for the acquisition of the flow rate for controlling the magnetic field through the same magnetoinductive flowmeter in which the magnetoinductive flow measuring method of this invention is implemented.

In addition, a preferred implementation of the invention employs a predefined sampling rate for detecting the flow volume. Sequential sampling values obtained with a constant magnetic field can thus be compared, with a change in the flow-sampling values to a point exceeding a predefined threshold triggering the periodic alternation of the magnetic field. Specifically, a preferred version of the invention provides for two consecutive flow-sampling values, obtained with a constant magnetic field, to be multiplied by +1 or −1, to derive from these flow-sampling values multiplied by +1 or −1 a flow-rate mean value which, when it exceeds a threshold value, triggers the periodically alternating reversal of the magnetic field. This utilizes the above-mentioned effect whereby, although in the case of a constant magnetic field no accurate flow measurement and thus no actual flow measuring operation is possible due to galvanic noise, it is definitely possible even in quantitative terms to detect a particular flow augmentation signaling the start of a draw-off process.

Where a predefined sampling rate serves to acquire the flow rate, i.e. to detect a change in the flow rate, a preferred embodiment of the invention provides for the predefined sampling rate extraneous to the flow measuring operation to be higher than the predefined sampling rate within the flow measuring operation. In more specific terms, this means that for a constant magnetic field the sampling rate will be higher than the sampling rate for a periodically alternating magnetic field. In the case of a periodically alternating magnetic field, the sampling rate is determined by the switching frequency of the magnetic field, in that for each half cycle, the magnetic field is sampled once through integration of the signal voltage following the stabilization time of the magnetic field. Where the design concept provides for the sampling rate extraneous to the flow measuring operation to be higher than that within the flow measuring operation, it is particularly desirable to make the sampling rate extraneous to the flow measuring operation a multiple integer of the sampling rate within the flow measuring operation. It is important in this connection that the sampling rate outside the measuring operation be independent of the stabilization process of the magnetic field, given that the magnetic field is constant. The higher the sampling rate outside the flow measuring operation, the more accurately the start of a draw-off process can be detected. The sampling rate is no longer limited by the frequency of the magnetic field reversal, but only by the quality of the electronics employed and especially that of the A/D converter serving to digitize the voltage measurement.

BRIEF DESCRIPTION OF THE DRAWINGS

There are numerous specific ways in which the magnetoinductive flow measuring method according to this invention can be implemented and further expanded. In that connection, attention is invited to the dependent claims and to the following detailed description of a preferred embodiment of the invention with reference to the following drawings, in which:

DETAILED DESCRIPTION OF AN ILLUSTRATIVE EMBODIMENT

Figure 1:
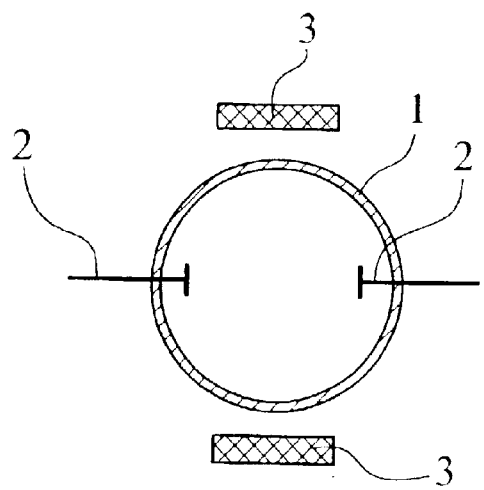
FIG. 1 is a schematic illustration of a magnetoinductive flowmeter for the implementation of the magnetoinductive measuring method according to one preferred embodiment of the invention.

Shown in FIG. 1 is a magnetoinductive flowmeter for implementing the magnetoinductive flow measuring method, described below, according to a preferred embodiment of the invention. The magnetoinductive flowmeter incorporates a measuring tube 1 through which flows a medium, not illustrated. It also contains two measuring electrodes 2 by means of which a measuring voltage induced by the medium flowing through the measuring tube 1 can be detected. Two field coils 3 serve to generate a magnetic field that extends perpendicular to the measuring-tube axis and to the connecting line between the measuring electrodes 2.

Figure 2:
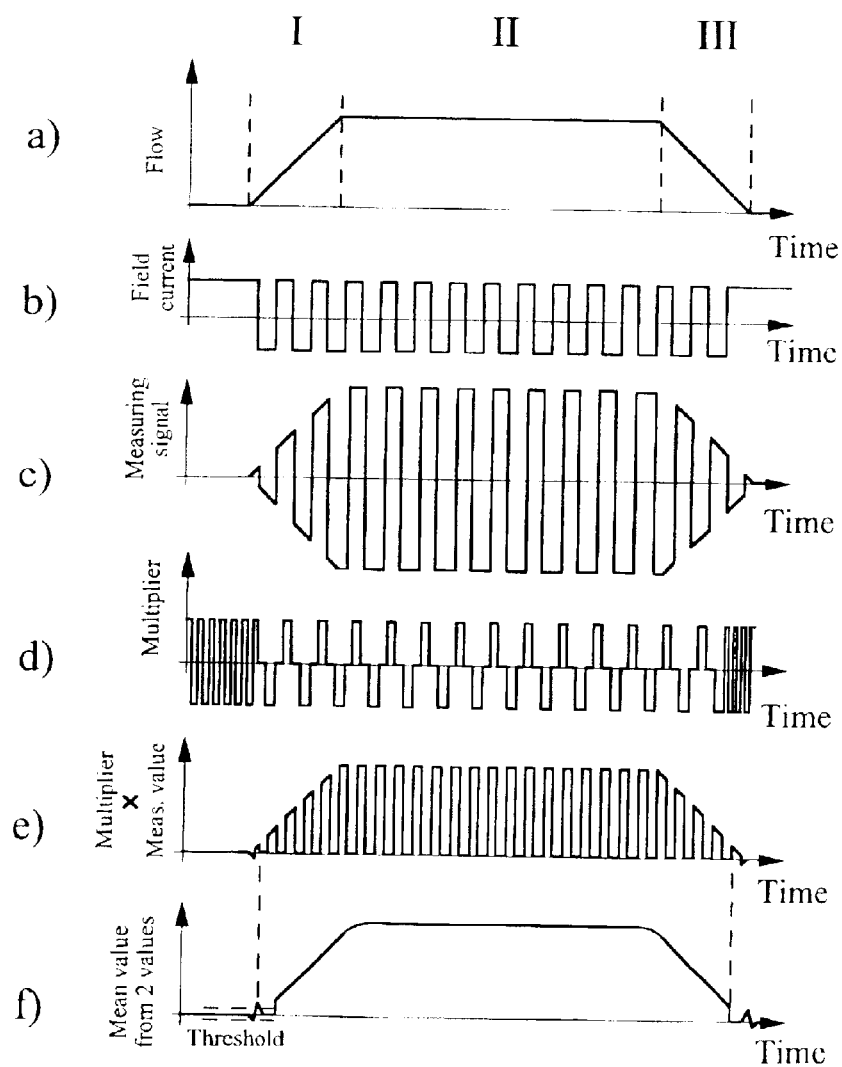
FIG. 2 shows schematically the progression of the magnetoinductive flow measuring method according to the preferred embodiment of the invention.

FIG. 2 shows schematically the progression of the magnetoinductive flow measuring method according to the preferred embodiment of this invention. In highly simplified fashion FIG. 2 illustrates the basic course of a draw-off process. In a first segment, marked I, denoting the start of the draw-off process, the flow rate rises from zero to a constant level. That is followed by the segment marked II, in which the flow remains constant. Segment III finally marks the end of the draw-off process where the flow recedes from constant back to zero. The progression of the flow in segments I and III along a time line is shown as a linear and thus highly simplified function. In practice, substantially more complex curves are possible, without changing the basic premise that the flow increases in segment I and decreases in segment III. In practice, the draw-off process outlined in FIG. 2, when applied to high-speed operation, typically takes a total of about 10 seconds, the major part of which is used up by the constant flow in segment II, whereas the draw-off start phase in segment I typically takes from 20 to 100 microseconds.

As indicated in FIG. 2 at b), the field current that feeds the field coils 3 is initially kept at a constant level. It is only at the beginning of segment I, at the start of the draw-off process, that the actual flow measuring operation is initiated and the magnetic field is switched in periodically alternating fashion. Specifically, according to FIG. 2 at b), a switched constant field is provided whose polarity is periodically reversed. The resulting measuring signal constituted of the voltage measured between the measuring electrodes 2 follows the pattern shown in FIG. 2 at c). For this measuring signal to yield a value indicating the flow rate of the medium traveling through the measuring tube 1, it is multiplied by a factor shown in FIG. 2 at d), resulting in a pattern as shown in FIG. 2 at e). A continuous signal reflecting the actual flow rate is obtained by interpolation between the individual oscillatory half-cycles, i.e. by deriving a mean value as shown in FIG. 2 at f).

The multiplier, "active" during predefined sampling times, is either +1 or −1. In a practical flow measuring operation, i.e. during periodic alternation of the magnetic field, the multiplier is "active" for every half-cycle of the magnetic field after the latter has stabilized at an essentially constant level. The sampling rate, meaning the frequency of the multiplier, appropriately corresponds to the frequency at which the polarity of the magnetic field is periodically reversed.

Before the actual measuring operation is initiated, i.e. prior to segment I, the multiplier does in fact assume a value of +1 and −1 in periodically alternating fashion. However, the sampling rate is substantially higher, in the case at hand four times as high. Specifically, in the preferred embodiment of the invention here described, the field frequency, meaning the frequency at which, in an actual flow measurement operation the constant field is periodically reversed, is 25 Hz, whereas prior to the start of the actual measuring operation with a constant magnetic field, a sampling rate of 100 Hz is employed.

In other words, the sampling frequency prior to the actual flow measuring operation is relatively high, permitting a chronologically highly precise determination of a change in the flow rate which, in the above-described preferred embodiment of the magnetoinductive flow measuring method according to this invention, is used as an indicator of the start of a draw-off process. The start of the actual flow measuring operation is determined in that, with the magnetic field in a constant state, each two consecutive sampling values collected between the two measuring electrodes 2 are multiplied by +1 or −1, a mean value for the flow rate is derived from these sampling values that were multiplied by +1 or −1, and as soon as the flow-rate mean value exceeds a predefined threshold, the actual measuring operation is initiated by the periodic alternation of the magnetic field.

What is claimed is:

1. A magnetoinductive flow measuring method for measuring the flow rate of a medium moving through a measuring tube that incorporates two measuring electrodes positioned along a connecting line extending in an essentially perpendicular direction relative to the measuring-tube axis, whereby a magnetic field is generated that extends at least in an essentially perpendicular direction relative to the measuring-tube axis and to the connecting line of the measuring electrodes and whereby the flow rate of the medium moving through the measuring tube is determined by measuring the voltage, respectively collected at one or both measuring electrodes, in comparison with a reference voltage potential, wherein the flow measuring operation is initiated upon detection of an increased flow rate.

2. The magnetoinductive flow measuring method as in claim 1, wherein during the flow measuring operation, the magnetic field is reversed in periodically alternating fashion.

3. The magnetoinductive flow measuring method as in claim 1 or 2, wherein the magnetic field is kept constant for as long as a constant flow is detected.

4. The magnetoinductive flow measuring method as in claim 1 or 2, wherein the flow measuring operation is terminated as soon as the flow-rate value measured drops below a predefined minimum level.

5. The magnetoinductive flow measuring method as in claim 2, wherein the periodically alternating magnetic field is changed into a constant magnetic field as soon as the flow-rate value measured drops below a predefined minimum level.

6. The magnetoinductive flow measuring method as in claim 1 or 2, wherein the acquisition of the flow-rate value used to control the magnetic field is performed by the same magnetoinductive flowmeter that is employed for the magnetoinductive flow measuring process.

7. The magnetoinductive flow measuring method as in claim 6, wherein the acquisition of the flow rate takes place at a predefined sampling rate, consecutive flow-rate sampling values obtained with a constant magnetic field are compared with one another, and a change of the flow-rate sampling values that exceeds a predefined threshold value triggers the periodically alternating reversal of the magnetic field.

8. The magnetoinductive flow measuring method as in claim 6, wherein the acquisition of the flow rate takes place at a predefined sampling rate, each two consecutive flow-rate sampling values obtained with a constant magnetic field are multiplied by +1 or −1, from these sampling values multiplied by +1 or −1 a flow-rate mean value is determined and, as soon as said flow-rate mean value exceeds a predefined threshold value, the magnetic field is reversed in periodically alternating fashion.

9. The magnetoinductive flow measuring method as in claim 6, wherein the predefined sampling rate outside the flow measuring operation is higher than the sampling rate during the flow measuring operation.

10. The magnetoinductive flow measuring method as in claim 9, wherein the sampling rate outside the flow measuring operation is an integral multiple of the sampling rate during the flow measuring operation.

* * * * *